United States Patent
Hagen et al.

(10) Patent No.: US 7,258,371 B1
(45) Date of Patent: Aug. 21, 2007

(54) CONNECTION SYSTEM

(75) Inventors: Harald Hagen, Wipperfürth (DE); Martin Hoffmann, Konz-Kommlingen (DE); Jörg Westmeier, Wipperfürth (DE); Volker Kaminski, Halver (DE); Norbert Terlau, Kürten (DE); Olav Borgmeier, Hückeswagen (DE); Reiner Mitterer, Wipperfürth (DE)

(73) Assignee: Voss Automotive GmbH, Wipperfurth (DE)

( * ) Notice: Subject to any disclaimer, the term of this patent is extended or adjusted under 35 U.S.C. 154(b) by 59 days.

(21) Appl. No.: 10/822,570

(22) Filed: Apr. 12, 2004

(30) Foreign Application Priority Data

Apr. 14, 2003 (EP) .................................. 03008547
Sep. 10, 2003 (DE) .......................... 203 14 133 U (51) Int. Cl.
     *F16L 39/00* (2006.01)
(52) U.S. Cl. ...................................... 285/321; 285/374
(58) Field of Classification Search ................ 285/321, 285/98, 374, 276, 281, 278
     See application file for complete search history.

(56) References Cited

U.S. PATENT DOCUMENTS

| 2,365,574 | A | | 12/1944 | McWane | |
|---|---|---|---|---|---|
| 4,741,560 | A | * | 5/1988 | Vigneron | 285/91 |
| 4,804,206 | A | * | 2/1989 | Wood et al. | 285/13 |
| 5,681,060 | A | * | 10/1997 | Berg et al. | 285/305 |
| 5,845,944 | A | * | 12/1998 | Enger et al. | 285/23 |
| 6,095,569 | A | * | 8/2000 | Hester | 285/81 |
| 6,749,231 | B2 | * | 6/2004 | LeMay et al. | 285/93 |

FOREIGN PATENT DOCUMENTS

| DE | 2002 02 810 U1 | 7/2001 |
|---|---|---|
| DE | 100 47 872 A1 | 10/2001 |
| EP | 0 806 594 | 11/1997 |
| EP | 1 164 317 | 12/2001 |
| EP | 1 213 515 | 6/2002 |

\* cited by examiner

*Primary Examiner*—David Bochna
(74) *Attorney, Agent, or Firm*—Brinks Hofer Gilson & Lione (57) ABSTRACT

A connection system for conduits, fittings or assemblies which are intended for carrying a fluid acted upon by a pressure ($p_1$), in particular for systems carrying carbon dioxide. The connection system comprises a first coupling part such as a housing part, a second coupling part such as a plug part, and is capable of being introduced into the first coupling part along an axis. At least one gas-permeable circumferential seal is arranged in a groove in one of the two coupling parts. One coupling part is capable of being plugged with a shank into a round receiving orifice of the other coupling part. After plugging-in, the circumferential seal seals off a gap between the outer radius of the shank and the inner radius of the receiving orifice.

30 Claims, 6 Drawing Sheets

CONNECTION SYSTEM

FIELD OF THE INVENTION

The present invention relates to a connection system for conduits, fittings or assemblies which are intended for carrying a fluid.

SUMMARY

The fluid in the system may be acted upon by a pressure increased with respect to a reference pressure, in particular for systems carrying carbon dioxide, comprising a first coupling part, such as a housing part, a second coupling part, such as a plug part, capable of being introduced into the first coupling part along an axis. The system including at least one gas-permeable circumferential seal which consists of an elastomer and is arranged in a groove having a groove depth and a groove length and being formed circumferentially in one of the two coupling parts. One coupling part being capable of being plugged with a shank into a round receiving orifice of the other coupling part, and, after plugging-in, the circumferential seal, while undergoing deformation and generating a radial prepressing force, sealing off a gap with a gap width between the outer radius of the shank and the inner radius of the receiving orifice and at the same time bearing against the coupling parts over a contact length running in the axial direction perpendicularly to the respective radius of the coupling parts.

The requirement for sealing-off arises wherever spaces with different pressures have to be separated from one another. In a connection system of the type described above, the pressure difference gives rise, in the gap between the coupling parts, to a flow which is to be prevented by the use of the circumferential seal. In fluid technology, elastomeric materials, for example in the form of O-rings, are employed predominantly for such seals. A precondition for achieving the sealing action is in this case the presence of a prepressing force or prestress against the faces to be sealed off, which is generated, utilizing the dimensional elasticity of the seal during its installation.

A system which is intended for carrying a fluid acted upon by a pressure is in motor vehicles, for example, the refrigerating circuit of air conditioning systems. In such a system, various halogenated hydrocarbon compounds, such as a refrigerant known by the name R134a and consisting mainly of tetrafluoroethane, have hitherto been used. Since all organic substances are gas-permeable, despite the use of seals, and mainly because of permeation through the circumferential seal, there is an unavoidable fluid stream of refrigerant from the space of higher pressure into the space of lower pressure (partial pressure).

It is known, in this context, that the leakage quantity caused by permeation is determined by the operating conditions of the system, such as pressure and temperature, the permeability of the elastomeric seals used for the connection system and the seal geometry.

Permeability, in turn, is material-dependent and is influenced, as its cause, by the solubility of the fluid and its diffusion velocity in the seal material. It is assumed, in this case, that absorption occurs at the seal on the side of the higher pressure, then diffusion occurs within the seal, and, finally, desorption occurs on the side of the lower pressure. In the stationary state, that is to say in the event of saturation of the elastomer with the fluid, the absorption and the desorption process are in this case described by Henry's law and the diffusion process by the first Fick's law.

The determination of the occurring quantity Q of the fluid which is penetrated through the circumferential seal as a result of permeation is based, starting from these laws, as described in DIN 53 536, on the equation $$Q = P * t * \Delta p * \frac{A}{L} \tag{1}$$

in which P represents the permeation constant of the seal material, t the time base, for example one year, $\Delta_p$ the pressure difference to be sealed off between an increased pressure $p_1$ of the fluid to be sealed off and a reference pressure $p_2$, and A/L a ratio of the cross-sectional area A of the deformed circumferential seal to a permeation length L through the seal, the latter being determined by the axial longitudinal extent of the deformed seal between the two coupling parts. The equation is based, in this case, on the fact that the seal is interpreted as a plane-parallel plate. The equation illustrates a linear proportional dependence of the quantity Q of the fluid which has penetrated through the circumferential seal—also designated hereafter as a leakage quantity—on the cross-sectional area A of the deformed circumferential seal, and a linear proportional dependence on the reciprocal value of the mean permeation length L, as a result of which, with a predetermined system pressure p and a predetermined operating period t, and to achieve a low leakage quantity Q, it is basically necessary to select the cross-sectional area A of the deformed circumferential seal so as to be as small as possible and the mean permeation length L so as to be as large as possible.

In practice, however, limits are placed on a dimensioning of this kind, since, to ensure a basic operating capability of the connection system, and with a view to the compensation of manufacturing tolerances of the coupling parts, the cross-sectional area selected for the deformed circumferential seal must be as large as possible in contradiction to the equation.

Furthermore, it must be borne in mind that the permeation constant P exhibits an exponentially rising profile with the temperature, this being described, for example, in the Article "Gasdurchlässigkeit von Elastomeren" ["Gas-permeability of elastomers"] by W Beckmann in a special issue of Kautschuk+Gummi Kunststoffe, volume 44, number 4/91, pages 323-329, Dr Alfred Hüthig Verlag, Heidelberg.

DE 100 47 872 A1 discloses a conduit connector, in which, taking into account the principle mentioned, the seal material, in a preferred version, extends over a length which is very much larger than its radially measured seal thickness, the disadvantage of which, however, is that, because non-positive connections tend to loosen under pulsating pressure, in the known system there is the need to press the seal together by means of a selflocking wedge.

When there is, during operation, a pressure of the refrigerant R134a, the upper level of which is about 30 bar and the lower level of which is about 3 bar, a leakage quantity Q of no less than 5 to 9 g per year and connection has hitherto been reached and accepted.

Since the said fluoro-hydrocarbons have a high greenhouse potential, as it is known, and are decomposed to form toxic or irritating breakdown products, a high environmental hazard therefore arises with regard to the multiplicity of motor vehicles equipped with air conditioning systems, at the present time about twelve million in Germany alone.

In motor vehicle technology, because of this, considerable efforts are made to substitute the known refrigerants by less harmful substances, in particular by carbon dioxide which occurs in any case in nature and can decompose naturally, for example, as a result of the photosynthesis of plants. The use of carbon dioxide as refrigerant in an air conditioning system affords the advantage of a many times higher refrigerating power related to volume flow, but also requires the transition to increased pressures and temperatures in the heat exchange processes. Thus, an upper level of about 180 bar and, at a temperature of −40° C., a lower level of about 10 bar is characteristic of the pressure occurring when a $CO_2$ air conditioning system is in operation, with the result that the sealing-off problem indicated becomes even more serious. The required temperature resistance of the connection in the upper range is in this case around 200° C., and therefore very high permeation constants must be expected. Moreover, when carbon dioxide is used, it must be borne in mind that this has, in an order of the gases after nitrogen, oxygen, helium and hydrogen, the relatively highest permeation constant for most conventional seal materials, as may be gathered, for example, from a corresponding comparison in the abovementioned article.

In German utility model DE 200 02 810 U1, a connection system with a special sealing part consisting of an elastomer-coated corrugated tube was described. This sealing part is to fulfill the sealing requirements for gases, such as carbon dioxide or hydrogen, and is to be axially elastic to an extent such that it can be used in a conventional plug-type system with axial play. This plug-type coupling has basically proved appropriate in practice, but, in conjunction with the elastomer-coated metallic sealing elements adversely high plugging forces and manufacturing tolerances which are difficult to adhere to occur.

The object on which the present invention is based is to provide a connection system of the type mentioned in the introduction, which, without additionally necessary supporting or mounting aids for the seal, such as a selflocking wedge or the like, and with a small quantity of the fluid which has penetrated through the circumferential seal, ensures, under high system pressures, in particular under system pressures of up to more than 150 bar, and with resistance in the temperature range of −40° C. to above 200° C., low plugging forces occurring during mounting and a high operating reliability, that is to say a reliable compensation of the manufacturing tolerances of the coupling parts.

This is achieved, according to the invention, in that the cross section of the nonpressed circumferential seal, the groove depth and the gap width and also the groove length are coordinated with one another in such a way that, in a ratio, determining permeation through the circumferential seal, of a permeation-active partial circumferential area of the circumferential seal to the contact length, the partial circumferential area is no greater than half the value of a cross-sectional area of the deformed circumferential seal, the said cross-sectional area running perpendicularly to the axial direction.

The invention is based, in the first place, on the recognition that it is possible, by coordinating the said variables with one another in a controlled way, to provide in a connection system a sealing-off, in which permeation through the circumferential seal is not determined by the ratio of the axially running cross-sectional area of the deformed circumferential seal to the axial length of the circumferential seal, but, instead, by the ratio of a permeation-active partial circumferential area of the circumferential seal to the contact length, over which partial circumferential area the circumferential seal bears against the coupling parts in the axial direction perpendicularly to the respective radius of the coupling parts. The invention is based, furthermore, on the recognition that, by the said variables being coordinated with one another, this partial circumferential area can be configured so as to be very much smaller than the axially running cross-sectional area, and that this leads, when the reduced ratio of the partial circumferential area to the contact length is taken into account in the application of the known calculation equation for dimensioning the seal geometry, to structural advantages which, in the case of a predetermined maximum permissible leakage quantity, are expressed in reduced necessary plugging forces. When, with the coupling parts in the plugged state, the said ratio is set in the circumferential seal to values which are determined by the fact that the partial circumferential area is no greater than half the value, preferably no greater than one fifth, of the cross-sectional area of the deformed circumferential seal, the said cross-sectional area running perpendicularly to the axial direction, the contradictory technical requirements mentioned in the introduction can be taken into account in an optimum way. What may even be achieved in this case is that the permeation-active partial circumferential area is independent of a cord thickness of the nonpressed circumferential seal.

To set the ratios of the cross-sectional area running perpendicularly to the axial direction and of the partial circumferential area of the deformed circumferential seal to the said contact length, the cross section of the nonpressed circumferential seal, the groove depth, the groove length and the gap width may in this case be selected as variables which can be varied, but are to be coordinated with one another.

What advantageously has a bearing in this case is that the sum of the groove depth and of the gap width results in the cross-sectional area, running perpendicularly to the axial direction, of the deformed circumferential seal having a width which determines the pressing of the circumferential seal and consequently a prepressing force, in which case the individual dimensions can be fixed concretely preferably by bearing in mind the Hertzian equations on the deformation of elastic bodies. In this case, it has proved particularly beneficial, from the point of view of the setting of low plugging forces during mounting, if the cross section of the circumferential seal in the nonpressed state already has a preform which may be described in that a quotient of an axial main extent and of a radial main extent of the seal cross section has a value greater than 1, preferably greater than 2, as, for example, with regard to a ring with an elliptic cross-sectional area.

Furthermore, advantageously, taking into account a possible thermal expansion of the circumferential seal a degree of filling of the groove, via which degree of filling the permeation-active partial circumferential area can be controlled in terms of its size, can be determined as a quotient of a fraction, lying in the groove, of the pressed radial cross section of the circumferential seal and of the cross-sectional area of the groove resulting from the groove depth and the groove length.

Further advantageous design features of the invention are contained in the subclaims and in the following description.

BRIEF DESCRIPTION OF THE FIGURES

The invention will be explained in more detail hereafter with reference to several preferred exemplary embodiments. Thus.

In the various figures of the drawing, parts identical to and corresponding to one another are always given the same reference symbols and are therefore in each case, as a rule, described once only hereafter.

DETAILED DESCRIPTION

Figure 1:
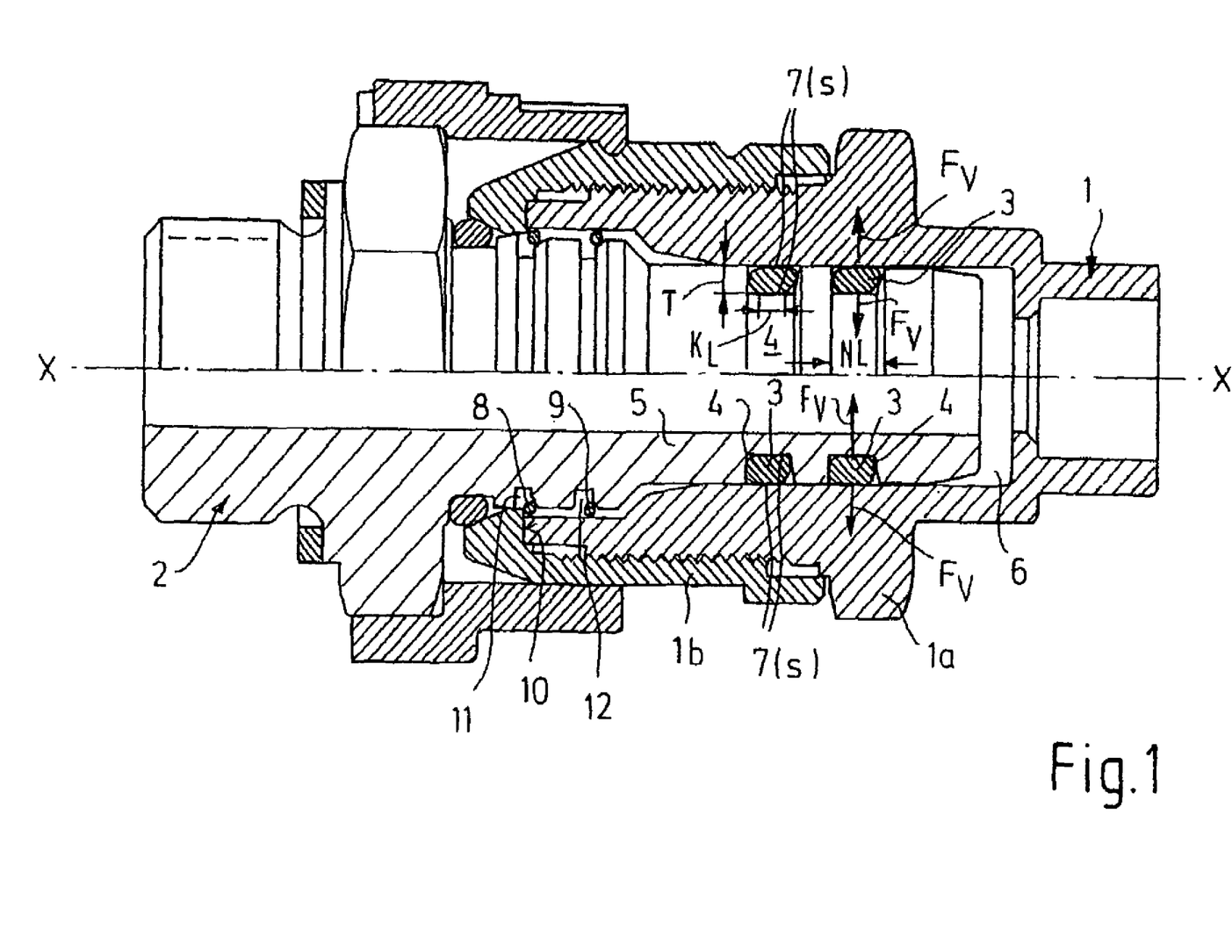
FIG. 1 shows, in longitudinal section, an illustration of a connection system according to the invention.

As may be gathered first from FIG. 1, a connection system according to the invention for fluidic systems, in particular for $CO_2$-carrying systems, a plug-type coupling in the case illustrated, comprises a first coupling part 1 in the form of a housing, a second coupling part 2 capable of being introduced into the first coupling part 1 along an X-X axis and taking the form of a plug part, and at least one, in the illustrated version two circumferential seals 3 consisting of an elastomer. The circumferential seals 3 are in each case arranged in a groove 4 which has a groove depth T and a groove length NL and which is formed circumferentially in one of the two coupling parts 1, 2—in the illustrated version in the second coupling part 2, the plug part. The second coupling part 2 has a shank 5 having a round basic configuration in cross section and can consequently be plugged into a receiving orifice 6 of the first coupling part 1, the said receiving orifice having a round basic configuration in cross section. The grooves 4 run circumferentially and parallel to one another in the casing of the shank 5.

After plugging-in, the circumferential seals 3, while undergoing deformation and generating a radial prepressing force $F_V$, close in each case a gap 7 with a gap width s which cannot be seen clearly in FIG. 1 and is therefore indicated there merely by a bracketed reference symbol "(s)". The enlargement in FIG. 2 shows a clear illustration.

Figure 2:
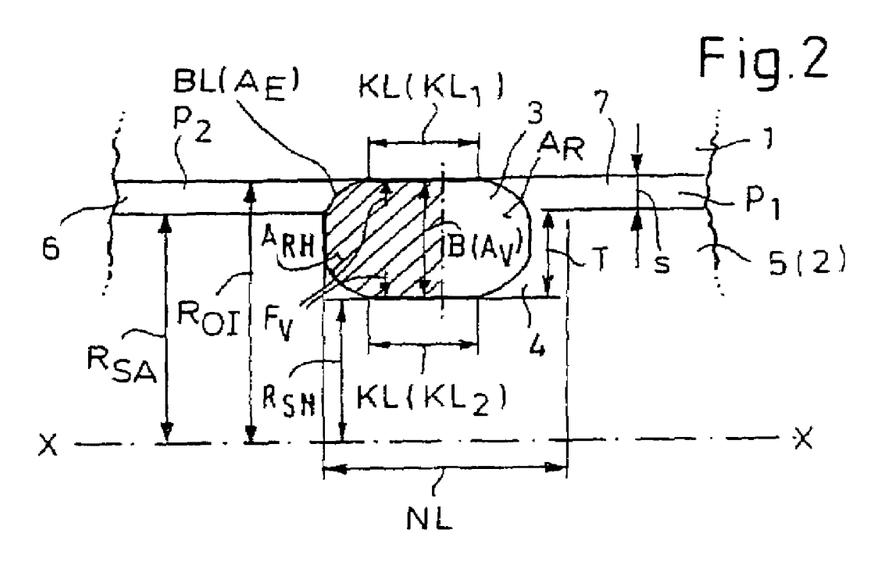
FIG. 2 shows, in longitudinal section, a partial illustration of a connection system according to the invention.

FIG. 2 also shows that the gap 7 is located between the outer radius $R_{SA}$ of the shank 5 and the inner radius $R_{OI}$ of the receiving orifice 6. The respective circumferential seal 3 closes the gap 7 and at the same time bears against the coupling parts 1, 2 at least over a contact length KL running in the axial direction X-X perpendicularly to the respective radius $R_{SA}, R_{OI}$ of the coupling parts 1, 2. A breadth B of the cross-sectional area $A_V$ of the deformed circumferential seal 3, the said cross-sectional area running perpendicularly to the axial direction X-X, is in this case obtained from the sum of the groove depth T and of the gap width s or from the difference between the inner radius $R_{OI}$ of the receiving orifice 6 and the radius $R_{SN}$ of the second coupling part 2 in the region of the bottom of its groove 4. For an annular ring formed between the coupling parts 1, 2, the cross-sectional area $A_V$ itself occurs as $A_{V=TT}*(R_{OI}^2-R_{SN}^2)$ and is therefore made clear in FIG. 2 by a bracketed reference symbol "$(A_V)$" under the reference symbol for the breadth B. The radial cross-sectional area of the pressed circumferential seal 3 is identified, instead, by the reference symbol $A_R$.

An area/permeation-length ratio $A_E/KL$ determining the permeation through the circumferential seal 3 is formed by a permeation-active partial circumferential area $A_E$ of the circumferential seal 3 to the contact length KL. The partial circumferential area $A_E$ is arranged in the vicinity of the gap 7 and is determined by the arcuate line BL of the pressed radial cross-sectional area $A_R$ of the deformed circumferential seal 3, the said arcuate line being emboldened in FIG. 2 (and also FIG. 8) and, in particular, not bearing against the coupling parts 1, 2. According to the invention, the partial circumferential area $A_E$ is no greater than half the value, preferably no greater than one fifth of the cross-sectional area $A_V$, running perpendicularly to the axial direction X-X, of the deformed circumferential seal 3. In the minimum case, with a disappearing arcuate curvature, the length of the arcuate line BL assumes the value of the gap width s. In this case, the cross section of the nonpressed circumferential seal 3, the groove depth T and the gap width s and also the groove length NL are coordinated with one another in such a way that the permeation-active partial circumferential area $A_E$ is independent of a cord thickness of the nonpressed circumferential seal 3. In the maximum case, the arcuate line BL should be no longer than half the value, preferably one quarter of the value, of the breadth B, that is to say of the sum of the gap width s and of the groove depth T.

In a special version on a connection system according to the invention, illustrated in FIG. 1, the plug part can be detained against release, in the plugged-in state, in the orifice 6 by means of an interlocking device (not designated in any more detail as a whole). The interlocking device consists in this case of at least one latching element—in the illustrated version, of two latching elements 8, 9 arranged axially one behind the other on the plug part—and of a latching shoulder 10 cooperating in each case with a latching element 8, 9. The latching elements 8, 9 are formed in each case by a spring ring held in each case in an annular groove 11, 12 of the plug part. The housing part is designed in two parts, in that it consists of an inner housing part 1a, which forms the main part of the receiving orifice 6, and of an outer housing part 1b connectable releasably to the inner housing part 1a and essentially surrounding the inner part 1a. The latching shoulder 10 is formed on the outer housing part 1b at one end in the entry region of the receiving orifice 6. As illustrated, the outer housing part 1b is designed as a union nut capable of being screwed together with the inner housing part 1a.

The second coupling part 2, that is to say the plug, and also the inner housing part 1a and the outer housing part 1b of the first coupling part 1 may preferably consist of metallic materials, in particular of aluminum alloys or highly alloyed high-grade steel alloys. The circumferential seals 3 may consist, for example, of a polymeric fluorocarbon compound, a synthetic rubber, such as silicone rubber, NBR or H-NBR, PUR, EPDM, SBR, or the like.

With regard to a degree of filling FG of the groove 4, calculated as a quotient of a fraction, lying in the groove 4, of the pressed radial cross section $A_R$ of the circumferential seal 3 and of the cross-sectional area $A_N=T*NL$ of the groove 4, to achieve a high sealing action and consequently a minimization of the leakage quantity Q, it is advantageous if this degree of filling FG lies in the range of 58.0 percent to 100.0 percent, preferably of 78.0 percent to 98.0 percent. Bearing in mind the possible thermal expansion of the circumferential seal, however, extrusion into the gap 7 should be avoided as far as possible. For a circumferential seal 3 having the cross-sectional form illustrated in FIG. 10a, the abovementioned degree of filling FG of the groove 4 should, in particular, be greater than 78.0 percent. In the case of an asymmetric position of the circumferential seal 3 in the groove 4, the same applies to a degree of filling FGH of the groove 4 which is calculated as a quotient of a comparatively larger fraction $A_{RH}$, lying in one half of the cross-sectional area $A_N$ of the groove 4 and illustrated by hatching in FIG. 2, of the pressed radial cross section $A_R$ of the circumferential seal 3 and of half the cross-sectional area $A_N/2$ of the groove 4. An asymmetric position of the circumferential seal 3 may in this case occur in that the latter is pressed in the axial direction X-X against one wall of the groove 4 due to the difference Δp between the increased pressure $p_1$ and the reference pressure $p_2$, whereas there is still a clearance between the wall of the groove 4 and the circumferential seal 3 on the other side of the groove 4.

The contact conditions made clear by FIG. 2 and occurring in each case between the circumferential seal 3 and the respective coupling part 1, 2 can be described with the aid of the Hertzian equations when the circumferential seal 3 and the coupling parts 1, 2 are interpreted as elastic bodies. The Hertzian equations can be applied to the configuration and size of the pressing area (flattening), to the approximation of the bodies to one another and to the size and distribution of the pressure stresses occurring under the influence of the prestressing force $F_V$, for example to the calculation of the maximum stresses which occur. These equations are elliptic integrals of the first type and have been determined on the basis of the strict elasticity theory.

For the calculation of special instances of the contact of specific bodies with surfaces of convex, planar or concave design, such as ball against plate, cylinder against cylinder, etc., special calculation formulae have been derived from the Hertzian theory, and in the present case, if the development of the circumferential seal 3 on the respective coupling part 1, 2 is considered, the contact of cylinder against plane may be assumed in a first approximation at the contact point. According to the invention, the cylinder is in this case the development of the circumferential seal 3, and the plane is the development of the respective coupling part 1, 2, that is to say either the inner surface area of the receiving orifice 6 or the outer surface area of the shank 5 on the bottom of the groove 4.

For maximum mechanical stress $\sigma_{max}$ occurring under normal force $F_N$ during contact between a cylindrical body with the radius R which bears against a planar body (with an infinite radius) over a length $L_A$, the following applies according to Hertz $$\sigma_{max} = \sqrt{\frac{F_N}{2\pi L_A R \Theta}} \quad (2)$$

in which $\Theta$ is a variable which is calculated from the moduli of the elasticity of the two bodies which is obtained according to the formula $$\Theta = \frac{1-V_Z^2}{E_Z} + \frac{1-V_E^2}{E_E} \quad (3)$$

in which the variables $v_z$ and $v_E$ are the respective transverse contraction coefficients or poisson's constants and $E_Z$ and $E_E$ are the respective moduli of elasticity of the cylindrical body and of the planar body.

Owing to the radially directed prepressing force $F_{V1}$ which occurs in the connection system according to the invention during the mounting of the seal 3 and corresponds to the normal force $F_N$ in equation (2), the seal contour is flattened and linear contact over the contact length KL occurs. In this case, a contact area $F_1=2*\pi*KL*R_{OI}$ is formed during contact between a circumferential seal 3 designed, for example, as an O-ring and the first coupling part 1 over a length $L_1$ which corresponds in equation (2) to the length $L_A$ and which is equal to the inner circumference $U_{OI}=2*\pi*R_{OI}$ of the first coupling part 1.

If it is assumed that the circumferential seal 3 consists of an elastomer and the first coupling part 1 of metal, then the addand which relates to the planar body can be ignored in equation (3), since, because the modulus of elasticity is very much higher in metal than elastomers, where it is very small, as compared with the addand which relates to the cylindrical body. Furthermore, a transverse contraction coefficient of 0.5 for the variable $v_Z$ may be adopted as first approximation in the calculation for elastomers in equation (3).

The following accordingly applies to a maximum mechanical stress $\sigma_{1max}$ during contact between the circumferential seal 3 and the first coupling part 1, $$\sigma_{1max} = 0.184 \sqrt{\frac{F_V E_D}{R_{OI} R_{RS}}} \quad (4)$$

In this $F_V$ is the prestressing force which acts in the radial direction and in which the seal 3 is pressed against the first coupling part 1, and $R_{OI}$ is the inner radius of the first coupling part 1. $E_D$ is the value of the modulus of elasticity of the circumferential seal 3. $R_{RS}$ is a measure of the convex curvature of the seal 3 in the radial direction, for example the cord radius $R_{SO}$ of an O-ring seal in a nonpressed state, as is specified in FIGS. 4 and 5. According to Hertz, the maximum mechanical stress $\sigma_{1max}$ is 1.5 times as great as the specific value of the prestressing force $F_V$ related to the contact area $F_1$ which is formed.

The flattening AP occurring at the contact point between a cylindrical and a planar body, with AP as half the contact breadth—in the present case, half the contact length KL—can be determined in general form according to the Hertzian equation $$AP = 2\sqrt{\frac{F_N \ominus R}{\pi L_A}} \quad (5)$$

Under the abovementioned boundary conditions, starting from this equation (5), the size of the contact length $KL_1$ between the inner radius $R_{OI}$ of the first coupling part 1 and the circumferential seal 3 is obtained as $$KL_1 = 0.78 \sqrt{\frac{F_V R_{RS}}{E_D R_{OI}}} \quad (6)$$

Presupposing a radially inwardly and outwardly symmetrical activation of the prestressing force $F_V$ in the circumferential seal 3, for a contact between the circumferential seal 3 and the second coupling part 2 the maximum mechanical stress $\sigma_{2max}$ and the contact length $KL_2$ between the radius $R_{SN}$ of the shank 5 on the bottom of the groove 4 and the circumferential seal 3 can be determined. The inner radius $R_{OI}$ of the first coupling part 1 is then replaced in equations (4) and (6) by the smaller radius $R_{SN}$ of the shank 5 of the second coupling part 2 on the bottom of the groove 4. The values of the maximum mechanical stress $\sigma_{2max}$ and of the contact length $KL=KL_2$ will therefore be greater than the corresponding values $\sigma_{1max}$ and $KL=KL_1$. For the design according to the invention of the connection system, the lower value $KL=KL_1$ must in this case be taken into account in the ratio $A_E/KL$ of the permeation-determining partial circumferential area $A_E$ of the deformed circumferential seal 3 to the contact length $KL$.

Equation (6) also makes clear that an enlargement of the contact length $KL$ can be brought about either by an increase in the prestressing force $F_V$ or by an enlargement of the radius of curvature $R_{RS}$ in the cross section of the nondeformed circumferential seal 3 or by a reduction in the modulus of elasticity $E_D$ of the seal material or by a smaller inner radius $R_{OI}$ of the first coupling part 1.

As regards the increase in the prestressing force $F_V$, it must be noted that, in this respect, that the size of the prestressing force $F_V$ when the shank 5 is plugged in, with the circumferential seal 3 already arranged in the groove 4, via the relation $F_S=\mu^* F_V$, given here only in general terms, with $\mu$ as a coefficient of friction to be interpreted integrally, influences in the same direction the plugging force $F_S$ necessarily to be applied and therefore, albeit in a gradation corresponding to the diameter of the seal, shall not exceed a predetermined value. Thus, for example, as is known, in the case of nominal diameters of 12 mm, required maximum plugging forces $F_S$ of below 50 N, preferably even of below 10 N, are reckoned on. For larger nominal diameters or else for small nominal diameters, but in the pressure range relevant to $CO_2$, higher plugging forces $F_S$ arise, which may amount to more than 100 N and 120 N. Such plugging forces $F_S$ can be avoided according to the invention, and advantageously, for the inner radii $R_{OI}$ of the first coupling part 1 in a range of about 6 mm to 13 mm, plugging forces $F_S$ of less than 100 N, preferably less than 50 N and even of less than 30 N, can be achieved.

Figure 4:
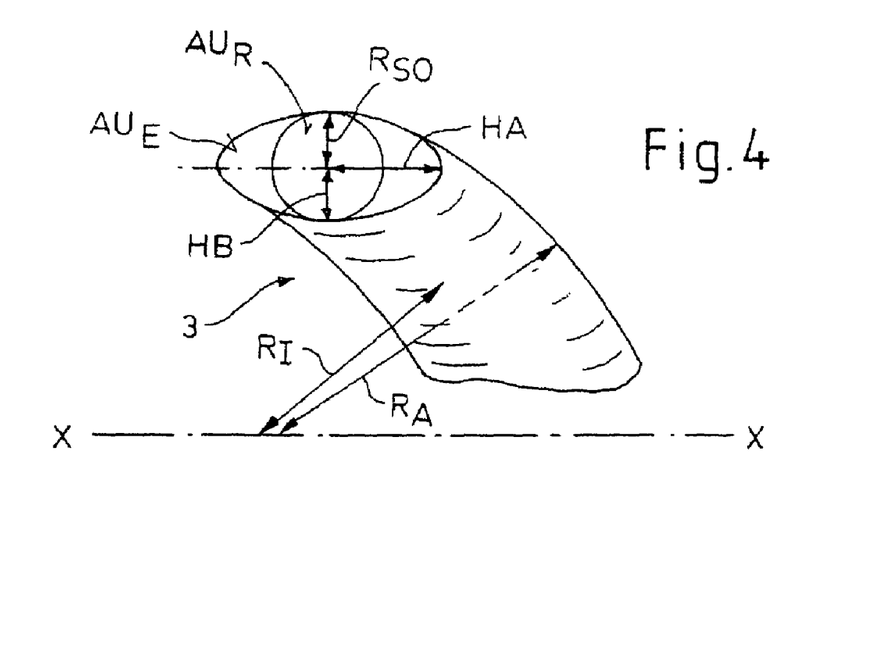
FIG. 4 shows a perspective sectional illustration of two embodiments of a circumferential seal for a connection system according to the invention which are projected one into the other.
Figure 6:
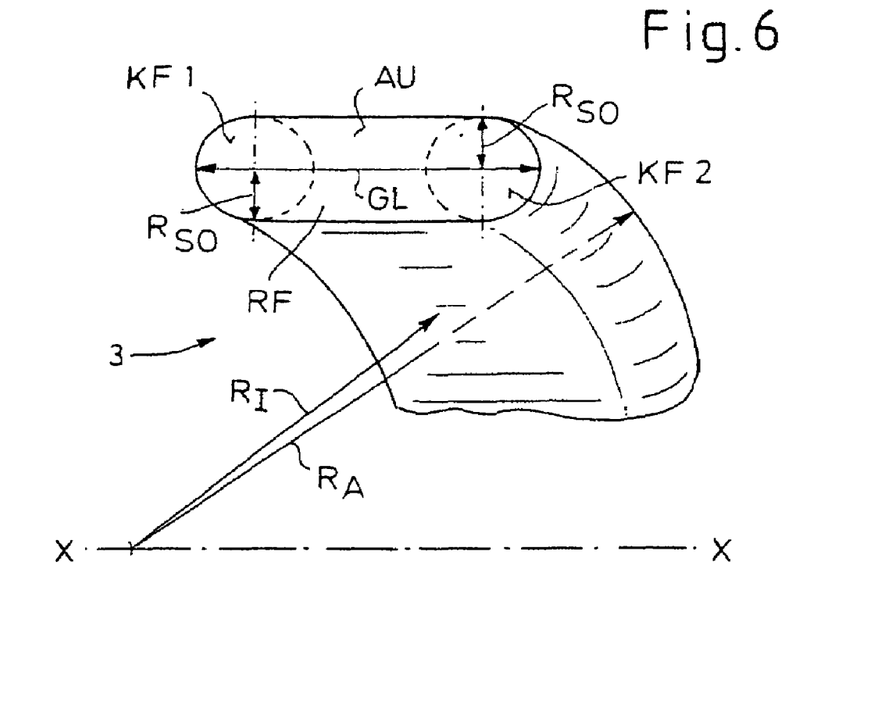
FIG. 6 shows, in an identical illustration to FIG. 4, a further embodiment of a circumferential seal for a connection system according to the invention.
Figure 7:
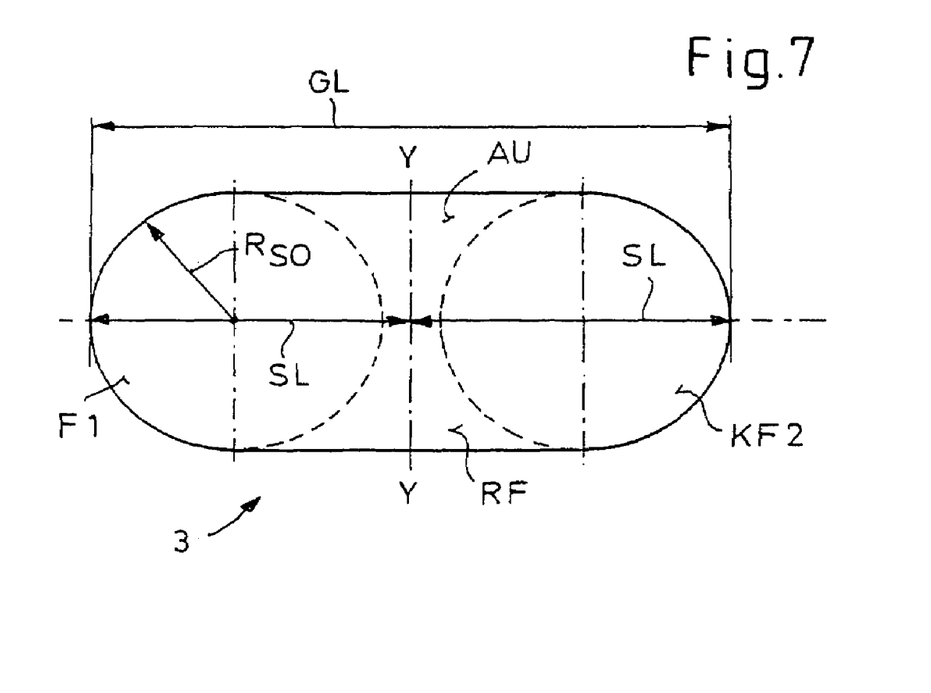
FIG. 7 shows a cross-sectional illustration of an embodiment, similar to the circumferential seal illustrated in FIG. 6, of a circumferential seal for a connection system according to the invention.
Figure 8:
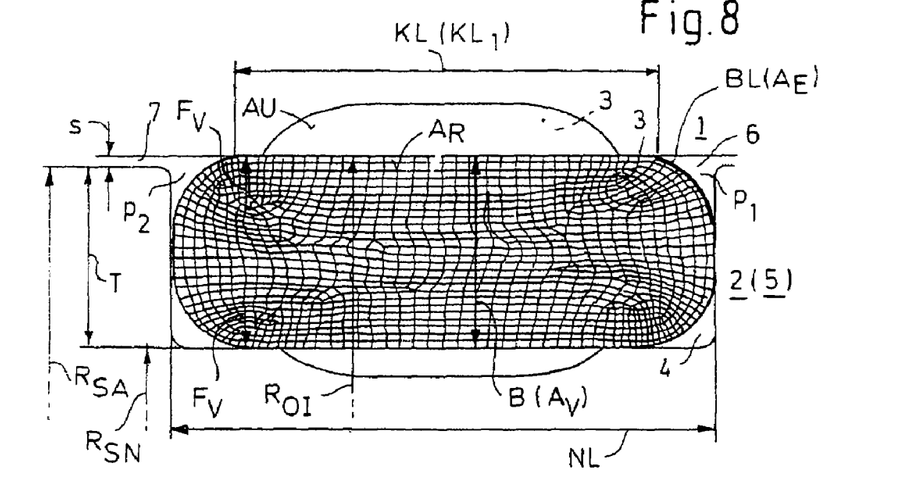
FIG. 8 shows, in an identical illustration to FIG. 2, a partial illustration of the connection system according to the invention with an embodiment of a circumferential seal of the type such as is illustrated in FIGS. 6 and 7.
Figure 9:
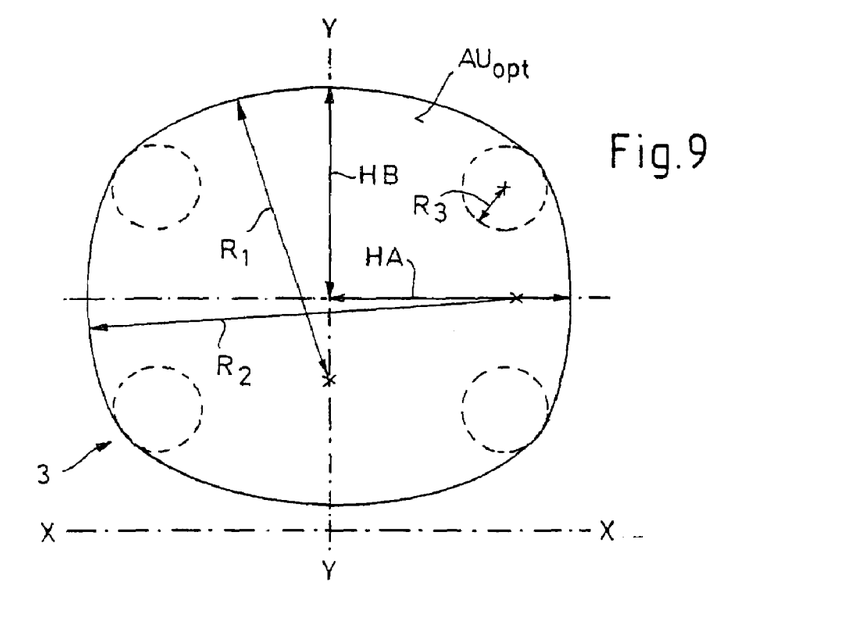
FIG. 9 shows, in an identical illustration to FIGS. 5 and 7, a further embodiment of a circumferential seal for a connection system according to the invention.

According to the invention, then, the cross section $AU_R$ or else $AU_E$ in FIG. 4, $AU$ in FIGS. 6 to 8 or $AU_{opt}$ in FIG. 9 of the nonpressed circumferential seal 3, the groove depth T, the groove length NL and the gap width s are specially coordinated with one another so that, during mounting, only low plugging forces $F_s$ occur and so that, in the case of a small quantity Q of the fluid which has penetrated through the circumferential seal 3 of a connection system according to the invention, under high system pressure differences $\Delta p$, in particular under system pressures $p_1$ of up to more than 150 bar or 180 bar, a reliable compensation of the manufacturing tolerances of the coupling parts 1, 2 takes place. The relations described above, in particular equation (6), may preferably be taken into account in this coordination.

Figure 3:
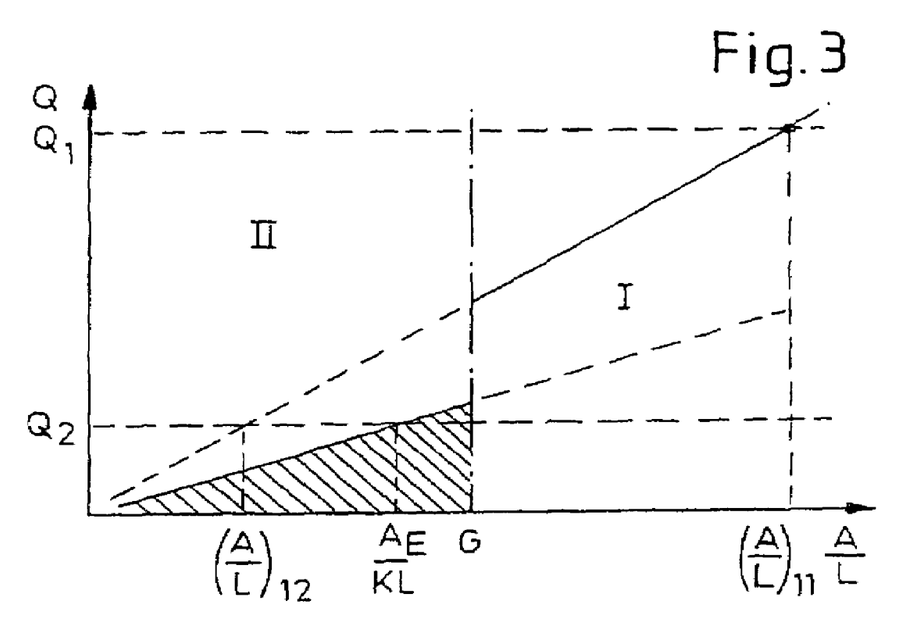
FIG. 3 shows a diagrammatic illustration of the dependence of the quantity of a fluid which is penetrated as a result of permeation through a fluid-saturated circumferential seal of a connection system on an area/permeation-length ratio.

The nature of the coordination according to the invention of cross section $AU_R$, $AU_E$, $AU$ or $AU_{opt}$ of the nonpressed circumferential seal 3, the groove depth T, the groove length NL and the gap width s with one another is made clear in FIG. 3 which, as already mentioned, illustrates a graph reproducing the dependence of the quantity Q of a fluid which as a result of permeation has penetrated through a fluid-saturated known circumferential seal or the circumferential seal 3 according to the invention of a connection system with a gas-permeable circumferential seal on a ratio A/L of a permeation area A of the deformed circumferential seal to a permeation length L through the circumferential seal.

The region designated by I in the right-hand part of the graph makes clear in this case the conditions in the circumferential seal used conventionally and dimensioned with the aid of equation (1) explained in the introduction, the assumption being, as described, of a linear proportional dependence of a leakage quantity Q on the cross-sectional area A of the pressed seal, the said cross-sectional area being oriented perpendicularly to the axial direction X-X, and a linear proportional dependence on the reciprocal value of the permeation length L. As regards the cross-sectional area A of the deformed circumferential seal, the said cross-sectional area running perpendicularly to the axial direction X-X, this is obtained from a cross-sectional area $A_V$, such as those described above with reference to FIG. 2.

Figure 10A:
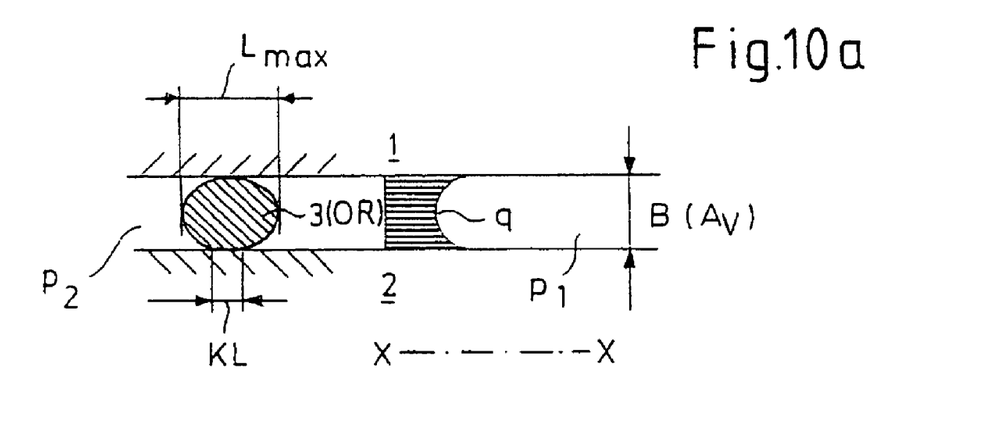
FIGS. 10a to 10c show, in a diagrammatic sectional illustration, three different embodiments of circumferential seals for a connection system according to the invention, with the illustration of a specific quantity of a fluid which is penetrated through the respective circumferential seal as a result of permeation.
Figure 10B:
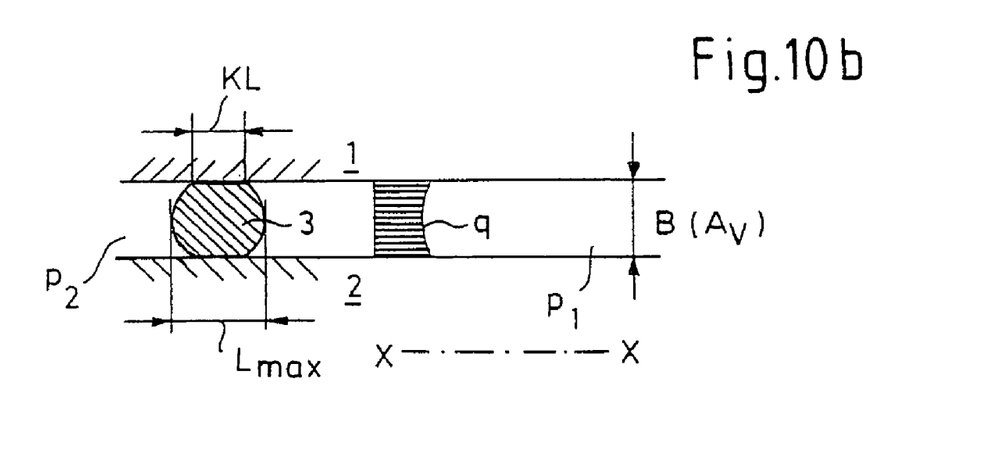
Figure 10C:
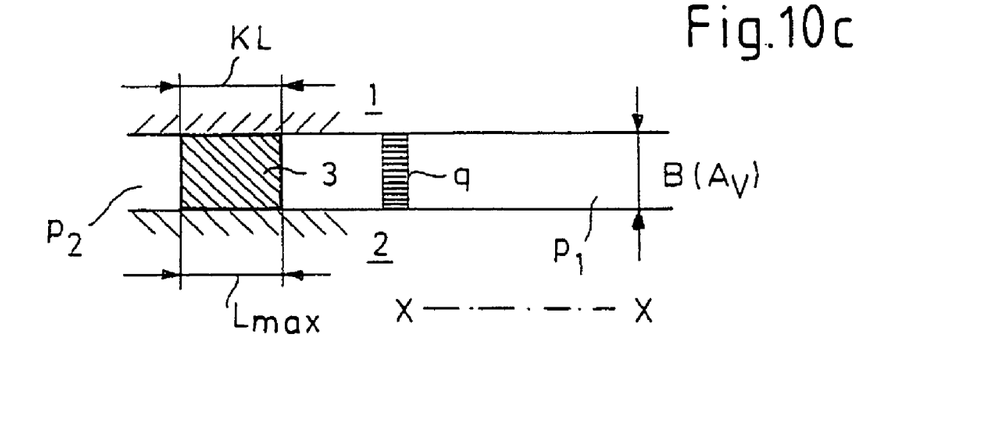

In a circumferential seal 3 used according to the invention, which, as illustrated by way of example in FIG. 2, is curved convexly in the axial direction X-X or in a circumferential seal 3 which, as illustrated in FIG. 10c, is not curved at all in the axial direction X-X, the shortest and therefore permeation-critical permeation length L is the contact length KL running in the axial direction X-X perpendicularly to the respective radius $R_{SA}$, $R_{OI}$ of the coupling parts 1, 2.

According to the invention, then, the ratio A/L assumes a ratio $A_E/KL$, determining the permeation through the circumferential seal 3, of the permeation-active partial circumferential area $A_E$ of the circumferential seal 3 to the contact length KL, in the ratio $A_E/KL$ the partial circumferential area $A_E$ being no greater than half the value of the cross-sectional area $A_V$ of the deformed circumferential seal 3, the said cross-sectional area running perpendicularly to the axial direction X-X. This is made clear in the left-hand part of the graph in a region which is designated by II in FIG. 3. In this region II, the quantity Q of the fluid which has penetrated through the circumferential seal 3 as a result of permeation is, after the saturation of the circumferential seal 3 with fluid has occurred, significantly lower than would be expected according to the conventional dimensioning method (made clear by a straight line from the region I being continued in the form of dashes).

The value $Q_1$ which may be gathered from FIG. 3 represents a leakage quantity Q of 5 to 9 g per year and connection such as is characteristic of the use of the refrigerant R134a in a motor vehicle air conditioning system.

When such a value $Q_1$, accepted hitherto, a specific operating period t and the operating pressure $p_1$ (for example, 30 bar) are stipulated, then, taking into account the equation (1) of a specific material, that is to say on the basis of a specific permeation constant P, a ratio $(A/L)_{11}$ is obtained, the setting of which can take into account the technical requirements existing hitherto.

When a lower value $Q_2$ than the value $Q_1$ accepted hitherto is stipulated, such as, for example, 2.5 or 1 g per year and connection, such as is sought after for the use of $CO_2$ as refrigerant in a motor vehicle air conditioning system, and when the further variables, namely the operating period t, the operating pressure $p_1$ (for example, 180 bar) or the pressure difference $\Delta p$ and the permeation constant P, are stipulated, with equation (1) being taken into account, a ratio $(A/L)_{12}$ is obtained. In practice, however, it has been shown that, when this ratio $(A/L)_{12}$ is set, the increased technical requirements can no longer be taken into account. The required low value $Q_2$ of the leakage quantity Q can then be achieved only by means of measures, such as, for example, an excessively long groove length and seal length, which cause extremely high plugging forces $F_S$ and cannot be justified in structural terms.

In contrast to this, along with low mounting forces $F_S$, the invention makes it possible to set a ratio $A_E/KL$ which fulfils the technical requirements, even when a very low leakage quantity value $Q_2$, such as is required for the use of $CO_2$ as refrigerant in a motor vehicle air conditioning system, is stipulated.

In order to achieve as low values $Q_2$ of the leakage quantity Q as possible, the ratio $A_E/KL$ may preferably lie below the limit value G illustrated in FIG. 3.

This limit value G, that is to say the ratio $A_E/KL$ determining the permeation through the circumferential seal 3, should, particularly for carbon dioxide as fluid, at room temperature be no greater than 50.0 mm, preferably no greater than 17.5 mm, at 100° C. no greater than 4.5 mm, preferably no greater than 1.2 mm, and at 150° C. no greater than 1.00 mm, preferably no greater than 0.25 mm.

Figure 5:
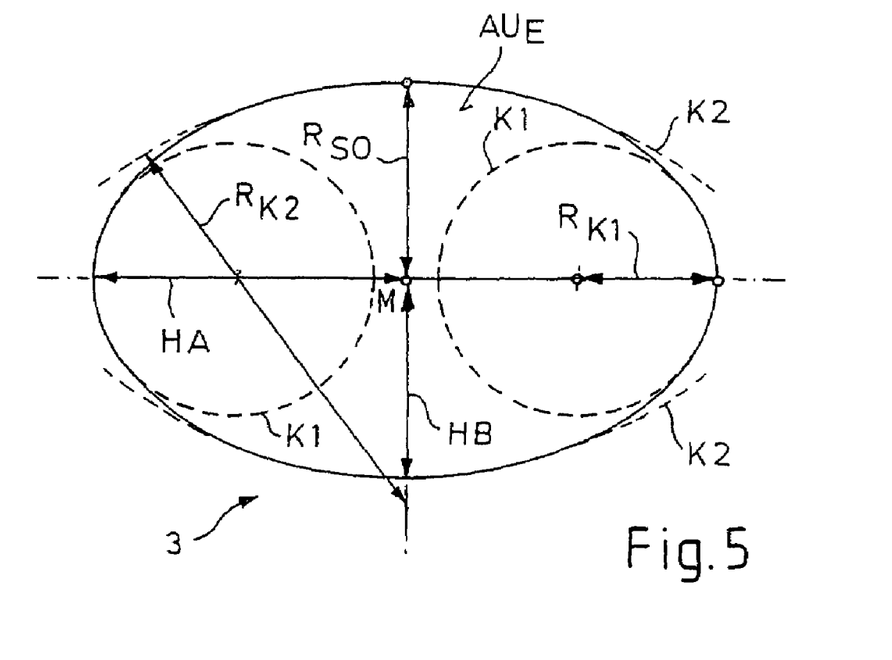
FIG. 5 shows a planimetric illustration to make clear an approximation of the vertex curvatures of a circumferential seal of elliptic cross section by circles.

It is shown hereafter, with reference to FIGS. 4 and 5, how, since the cross section $AU_E$ of the circumferential seal 3 already has an elliptic form in the nonpressed state, an enlargement of the contact length KL can be brought about, as compared with an O-ring.

As already mentioned, $R_{RS}$ is a measure of the convex curvature of the circumferential seal 3 and in the case of an O-ring, such as is illustrated as a core in FIG. 4, is determined by the cord radius $R_{SO}$ of the circular cross section $AU_R$ Of the cord. In contrast to this, in the case of a circumferential seal 3 which, as the form of the cross section $AU_E$, has an ellipse, such as circumscribes the circular cross section in FIG. 5 $AU_R$, there is no uniform curvature over its cross-sectional circumference, since the uniform radius of curvature $R_{SO}$ of the circle is replaced by a long semi-axis HA and a short semi-axis HB.

It is possible, then, to express these semi-axes HA, HB according to a coordinate transformation with respect to the said circular radius $R_{SO}$ by the relations HA=$U*R_{SO}$ and HB=$V*R_{SO}$. For the transformation factors U, V, for example, U≈2 and V=1, that is to say HB=$R_{SO}$, applied to the ratios illustrated in FIG. 4, the inner radius $R_I$ and the outer radius $R_A$ of the respective ring of the two embodiments of the circumferential seal 3 which are projected one into the other are uniform for both versions.

Furthermore, in a sufficiently accurate approximation construction for the ellipse, it is possible to introduce vertex curvature circles K1, K2 which mate as closely as possible with the said ellipse in the vicinity of the vertices, as shown in FIG. 5. In this case, it can be shown that the radii $R_{K1}$ and $R_{K2}$ of the vertex curvature circles K1, K2 can be calculated according to the relations $$R_{K1} = \frac{V^2}{U} R_{SO} \text{ and} \quad (7)$$

$$R_{K2} = \frac{U^2}{V} R_{SO} \quad (8)$$

For the case illustrated, therefore, as regards the radius $R_{K2}$ which is important in terms of the design of the connection system according to the invention, the result is that this radius assumes four times the value of the radius $R_{SO}$ of the circle inscribed into the ellipse. If this value $R_{K2}$ is taken into account as the curvature dimension $R_{RS}$ in equation (6), this means that, with the prestressing force $F_V$ remaining the same, the contact length KL can be doubled or that, with the contact length KL remaining the same, the prestressing force $F_V$ and consequently the necessary plugging force $F_S$ can be lowered to a quarter.

Both to achieve a favorable ratio $A_V/KL$ of the cross-sectional area $A_V$, running perpendicularly to the axial direction X-X, of the deformed circumferential seal 3 to the contact length KL and to achieve a favorable ratio $A_E/KL$ of the permeation-determining partial circumferential area $A_E$ to the contact length KL, it is thus advantageous if the cross section $AU_E$ of the circumferential seal 3 in the nonpressed state already has a preform in which a form coefficient, a quotient $FZ_U$=HA/HB of an axial main extent of the seal cross section $AU_E$, in the illustrated case the large semi-axis HA of the ellipse, and of a radial main extent, in the illustrated case the small semi-axis HB of the ellipse, has a value greater than 1, preferably greater than 2.

This is also the case in the further embodiments, illustrated in FIGS. 6 to 8, of a circumferential seal 3 for a connection system according to the invention. It is characteristic of these embodiments that the cross section AU of the nonpressed circumferential seal 3 is composed, symmetrically to a mid-axis Y-Y, of two semicircular areas KF1, KF2 of equal size—this could also be areas in the form of a segment of a circle—and of a rectangular area RF lying between them.

As in FIG. 4, in FIGS. 6 and 7, but twice in contrast to FIG. 4, an O-ring is inscribed into the cross-sectional form illustrated as a further version. The O-ring determines with the radius $R_{SO}$ the radial main extent HB of the cross section AU of the cord and the curvature in the axial direction X-X. The axial main extent HA is obtained as the side length SL of the semi-area of the cross section AU which has the axial overall length GL. The choice of this overall length GL—for example, in relation to a predetermined groove length NL—constitutes, in addition to the size of the radial deformation of the circumferential seal 3 during mounting, a further possibility for varying the degree of filling FG of the groove 4 in the pressed state.

As in the case of the circumferential seal 3 with the elliptic cross section (FIGS. 4 and 5), according to FIGS. 6 to 8, too, there is no uniform curvature over the cross-sectional circumference. Thus, the curvature formed in the radial direction is determined by the rectangular area RF having a side length GL-$2*R_{SO}$; and a corresponding radius of curvature assumes the infinite value. FIG. 8 shows, in a similar form to FIG. 2, the pressed circumferential seal 3, illustrated as being filled in a net-like manner, in comparison with the nonpressed circumferential seal 3. It may in this case be gathered from the illustration that there is a high degree of filling FG of the groove and that the length of the arcuate line BL is no greater than half the value of the sum of the gap width S and of the groove depth T.

FIG. 9 shows a further version, to be considered as optimal, of a circumferential seal 3 for a connection system according to the invention, which is distinguished in that the cross section $AU_{opt}$ of the nonpressed circumferential seal 3 consists in its basic configuration of a rectangle which has two longitudinal sides curved convexly with a first radius of curvature $R_1$, two transverse sides curved convexly with a second radius of curvature $R_2$ and four corners rounded convexly with a third radius of curvature $R_3$. The third radius of curvature $R_3$, which, in particular, determines the arc length BL during the pressing of the circumferential seal and influences the degree of filling FG, is in this case smaller than the first radius of curvature $R_1$ determining, in particular, the contact length KL, and the first radius of curvature $R_1$ is, in turn, smaller than the second radius of curvature $R_2$ which likewise codetermines the arc length BL and the degree of filling FG, but to a lesser extent that the third radius $R_3$. By means of such a cross-sectional form, in the case of a high degree of filling FG of the groove 4 and a low prestressing force $F_V$, a short arc length BL and consequently a smaller permeation-active partial circumferential area $A_E$, as compared with an O-ring or a ring with an elliptic cross section, can be achieved. In this version, too, the cross section $AU_{opt}$ of the circumferential seal 3 already has, in a nonpressed state, a preform in which the form coefficient, the quotient $FZ_U$=HA/HB of an axial main extent HA of the seal cross section $AU_{opt}$ and of a radial main extent HB, has a value of greater than 1, preferably of greater than 2.

FIG. 10a to 10c show that depending on the embodiment of the circumferential seal 3, for a specific leakage quantity q, that is to say for a leakage quantity Q, related to the cross section $A_V$ of the pressed circumferential seal 3, of the fluid which has penetrated through the respective circumferential seal 3 as a result of permeation, a different profile of the specific leakage quantity q is established and is dependent on the form of the cross section $A_V$ of the pressed circumferential seal 3.

FIG. 10a shows a pressed O-ring OR. With a ratio of inside diameter $2*R_I$ to the thickness of its cord $2*R_{SO}$ of $\leq 6$, preferably of <3, and with a strong minimum pressing VP, that is to say with a value VP=100%*(1−B/(2*$R_{SO}$)) of more than 15 percent, preferably more than 25 percent up to a maximum of 40 percent, such an O-ring OR forms, in the mounted state, a very much more pronounced oval than a standard O-ring under normal pressing VP. This means that the cross section $AU_R$ of the nonpressed O-ring OR, the groove depth T and the gap width s are coordinated with one another in such a way that a contact length KL is established which is suitable for setting an optimum value of the ratio $A_E$/KL, that is to say below the limit value G in FIG. 3, hence in the region II.

FIG. 10b shows a circumferential seal 3 with a contact length KL lengthened with respect to an O-ring OR simply due to the geometric configuration of its cross section in the nonpressed state. In a circumferential seal 3 of this type, which, like the version according to FIGS. 4 and 5 with the elliptic cross section $AU_E$ and the versions according to FIGS. 6 to 8 and 9, does not have to be pressed to a greater extent in the mounted state than a standard O-ring, the mounting forces and also the expansion necessary during mounting can be kept low. The risk of damaging the circumferential seal 3 during mounting or of tearing it out of the groove 4 is also lower than in the case of the O-ring OR with circular cross section.

FIG. 10c shows a circumferential seal 3 with an area of the cross section $A_V$ which is rectangular in the pressed state. The rectangle sides lying in the axial direction X-X are in this case longer than the rectangle sides lying in the radial direction. When such a circumferential seal is introduced into a groove, the permeation-active partial circumferential area $A_E$ is independent of the cord thickness of the nonpressed circumferential seal and the arcuate line BL assumes the value of the gap widths.

In all the versions of the circumferential seal 3, the shortest permeation length L is the contact length KL with which the circumferential seal 3 bears against the respective coupling part 1, 2. The respectively largest permeation length L is designated in FIGS. 10a to 10c by $L_{max}$. It becomes clear in this case from the profiles of the specific leakage quantity q that, due to a lengthening of the contact length KL, the permeation path L and therefore the overall leakage quantity Q, which, by integrating the specific leakage quantity q over the cross section $A_V$, is obtained as the area, illustrated in the figures, below the curve q, can be reduced.

The difference between the respectively largest permeation length $L_{max}$ and the contact length KL decreases from FIG. 10a to FIG. 10c. In the version of the circumferential seal 3 illustrated in FIG. 10c, which is to be considered as optimal from the point of view of a low leakage quantity Q, the largest permeation length $L_{max}$ is identical to the contact length KL. The form shown in FIG. 10c, in particular a rectangle as the pressed radial cross section $A_R$, which has a larger side length in the axial direction X-X than in the radial direction, therefore seems to be particularly advantageous. In the versions shown in FIG. 10b and 10c, it must also be assumed that, in the nonpressed state in a similar way to the cross section $AU_E$ in the version according to FIGS. 4 and 5, in a similar way to the cross section AU in the versions according to FIGS. 6 and 7 and in a similar way to the cross section $AU_{opt}$ in the version according to FIG. 9, the cross section of the circumferential seal 3 already has a preform in which the quotient $FZ_U$=HA/HB of an axial main extent of the seal cross section and a radial main extent has a value of greater than 1, preferably greater than 2. It must be mentioned, however, that a ratios during mounting, in particular the pressing, the filling of the groove 4 and the size of the mounting force $F_S$, may in part, as in the purely rectangular form, be less favorable than in the case of another cross section.

Thus, on the one hand, in the case of plugging forces $F_S$ of about 120 N, a value $Q_2$ of the quantity Q of the fluid which has penetrated through the circumferential seal 3 as a result of permeation of less than 2.5 g per year and connection, in particular of less than 1 g per year and connection, was achieved by an 8.0×5.0 O-ring consisting of H-NBR, with a mean pressing VP of 25.0 percent, although the latter could fluctuate as a consequence of tolerance within the range of 21.2 percent to 27.4 percent. The mean degree of filling FG of the groove falls in this case around 86.0 percent and could fluctuate within the range of 78.2 percent to 92.1 percent. The axial length NL of the groove 4 was around 5.8 mm, the depth T of the groove 4 was in the range of 3.47 mm to 3.63 mm, the gap width s was in the range of 0.05 mm to 0.25 mm, the inner radius $R_{O1}$ of the receiving orifice 6 was around 7.75 mm, the radius $R_{SN}$ of the shank 5 on the bottom of the groove 4 was around 4.0 mm, and the radius $R_{SO}$ of the cord of the cross section $AU_R$ in the nonpressed state was around 2.5 mm. A contact length KL of about 4.5 mm was formed at room temperature.

On the other hand, with plugging forces $F_S$ greatly being reduced in comparison (less than 60 N) just such a low value $Q_2$ of the leakage quantity Q was achieved by an oval ring likewise consisting of H-NBR, with a mean pressing VP of 22.5 percent, although the latter could fluctuate to the consequence of tolerance within the range of 16.3 percent to 26.8 percent. The ring, in the nonpressed state, possessed a cross-sectional form, such as is illustrated in FIGS. 6 to 8, the axial overall length GL of the cross section AU being around 3.55 mm and the radius $R_{SO}$ being around 1.25 mm. The mean degree of filling FG of the groove 4 was within the range of 58.6 percent to 90.0 percent. The axial length NL of the groove 4 was around 4.9 mm, the depth T of the groove 4 was in the range of 3.47 mm to 3.63 mm, the gap width s was in the range of 0.05 mm to 0.25 mm, the inner radius $R_{OI}$ of the receiving orifice 6 was around 6.2 mm, and the radius $R_{SN}$ of the shank 5 on the bottom of the groove 4 was around 4.35 mm. A contact length KL of about 3.9 mm was formed at room temperature.

Although no groove 4 is illustrated in the illustrations in FIGS. 10a to 10c, the corresponding ratios for the contact length also apply in the presence of a groove. Moreover, it can be inferred from this that a connection system according to the invention possesses a particularly favorable design when, in the radial cross section $A_R$ of the deformed circumferential seal 3, the contact length KL differs by less than about 15 percent, preferably by less than about 10 percent, particularly preferably by less than about 5 percent, from the maximum axial permeation length $L_{max}$ through the circumferential seal 3, that is to say when, for example, the seal 3 has a very large radius of curvature in the axial direction, like the radius $R_2$ in FIG. 9. This is also to be borne in mind in the dimensioning of a cross section $AU_E$ which is elliptic in nonpressed state, when the length of the semi-axes HA, HB is fixed, and bearing in mind the coordinate transformation when the coefficients U and V are fixed.

Furthermore, it is important for a connection system according to the invention that a gas leakage stream GLS occurring in it is always composed additively of two components. On the one hand, this is the quantity Q of the fluid which has penetrated through the circumferential seal 3 as a result of permeation, and, on the other hand, over the contact length KL, there is a possible path for microleakage streams MQ, the size of which is determined by the topography of the surfaces of the coupling parts 1, 2. In the connection system according to the invention, advantageously high sealing-off against the microleakage streams MQ can be achieved in that a maximum roughness value $R_{max}$ of the surfaces of the coupling parts 1, 2, at least in the region of the outer radius $R_{SA}$ of the shank 5 and of the inner radius $R_{OI}$ of the receiving orifice 6, where the circumferential seal 3 comes to bear, is lower than 16 μm, preferably lower than 10 μm. In particular, a mean roughness $R_a$ should lie in the range of 0.3 to 0.8 μm, and this can advantageously be achieved, in the case of diameters of 12 to 25 mm, in that the facings which are provided with an overdimension of 0.018 to 0.040 mm and which, in the preprocessed state, should have a roughness $R_a$ in the range of 1.6 to 3.2 μm, are smooth-rolled. Owing to the smooth rolling, an optimum design of the carrying profile of those surfaces of the two coupling parts 1, 2 which are in contact with the circumferential seal can also be achieved. The microleakage streams MQ are then very small, in particular negligibly small, in the gas leakage stream GLS, as compared with the quantity Q of the fluid which has penetrated through the circumferential seal 3 as a result of permeation.

In a connection system according to the invention, an advantageous seal arrangement is also obtained by a plurality of circumferential seals 3 being connected axially one behind the other, as is shown for two circumferential seals 3 in FIG. 1, since the contact length KL is thereby lengthened. Although, to achieve the greater permeation path—the total contact length KL—the outlay is in this case higher than when only one O-ring is used, the non-pressed cross section $AU_E$ of which is preformed, for example, elliptically, such an arrangement may also be advantageous from another point of view. Thus, for example, with the aging of EPDM as seal material which takes place under the influence of oxygen, the permeation coefficient P becomes markedly lower. This could be utilized, for example, in a connection of circumferential seals 3 one behind the other, in that an outer circumferential seal 3 accessible to the surrounding atmosphere has a reduced permeability coefficient P as a consequence of aging after a particular operating period t and the inner circumferential seal 3 with a higher permeability coefficient P is protected more effectively from the surrounding influences which may also lead to an undesirable embrittlement of the seal material.

The invention is not restricted to the exemplary embodiments illustrated, but also embraces all versions having the same effect within the meaning of the invention. Thus, for example, it is possible to use the type of connection according to the invention not only in a plug-type coupling, as illustrated, but also in systems with block or screw connections. Furthermore, it is possible that not only the first coupling part 1, instead of the second coupling part 2, has the groove 4. Various structural details may also be designed otherwise than illustrated. Thus, for example, in the version according to FIG. 9, the first radius $R_1$ could be selected larger than the second radius $R_2$.

The versions of the circumferential seal 3 which are illustrated in FIGS. 4 to 9, having the features described above, possess independent inventive significance.

Finally, further criteria may also be added to the coordination according to the invention during fixing the cross section $AU_R$, $AU_E$, AU, $AU_{opt}$ of the nonpressed circumferential seal 3, namely the groove depth T, groove length NL and gap width s, such as, for example, the dimensioning carried out, as is known, by means of nonograms which contain a relation between gap width s and operation pressure $p_1$ for specific material hardnesses of the material of the circumferential seals 3. In this case, with regard to equation (6), attention must be given, in particular, to a possible correlation between the modulus of elasticity $E_D$ and the Shore A hardness of the material. A Shore A hardness in the range of 70 to 90 has proved beneficial.

The theoretically determined coefficients 0.184 and 0.78 as specified in equations (4) and (6) and standing in front of the respective root term may differ from the values occurring in practice, since the preconditions on which they are based are fulfilled only approximately. The values specified concretely may therefore be expressed in general form in each case by constants C1 and C2 to be determined.

The Hertzian equations, specifically, in particular, the equation for the approximation of two elastic bodies pressed onto one another, may advantageously also be applied to the pressing VP which, as has been shown, incorporates in terms of calculation the breadth B which is obtained, in turn, from the ratio of the sum of the groove depth T and of the gap width s to the radial main extent of the circumferential seal 3, such as the small semi-axis HB of the ellipse or the radius $R_{SO}$ of the circle.

To reduce the permeation, a circumferential seal 3 of a connection system according to the invention may additionally be provided with a special gas barrier coating, for example a coating with slip lacquer based on polyurethane, or with a permeation-reducing coating applied by spray coating, in a preferred thickness range 15 μm to 60 μm, in particular, in the case of a round coating of O-rings, in a thickness range of 20 μm to 30 μm.

Furthermore, the invention has hitherto also not yet been restricted to the feature combination defined in the independent claims, but may also be defined by any other combination of specific features of all the individual features disclosed as a whole. This means that, in principle, virtually any individual feature of claim 1 or else 31 may be omitted or be replaced by at least one individual feature disclosed elsewhere in the application. To that extent, the claims are to be understood merely as a first attempt at the formulation of an invention.

| Reference symbols | |
|---|---|
| 1 | First coupling part (housing part) |
| 1a | Inner housing part |
| 1b | Outer housing part |
| 2 | Second coupling part (plug part) |
| 3 | Circumferential seal |
| 4 | Groove for 3 in 5 |
| 5 | Shank of 2 |
| 6 | Receiving orifice of 1 |
| 7 | Gap between 1 and 2 |
| 8, 9 | Latching elements |
| 10 | Latching shoulder |
| 11,12 | Annular grooves for 8, 9 |
| I | Linear region of the dependence Q on A/L |
| II | Nonlinear region of the dependence Q on A/L |
| A | Permeation area, deformed axial seal cross section |
| $A_E$ | Partial circumferential area of 3, pressed |
| $A_N$ | Cross section of 4 |
| $A_R$ | Radial cross section of 3, deformed |
| $A_V$ | Cross section of 3, deformed, perpendicularly to the axial direction |
| $A_{RH}$ | Radial cross section of 3, deformed in one half of 4 |
| AP | Flattening |
| AU | Radial cross section of 3 (version in FIG. 6 and 7), nonpressed |
| $AU_E$ | Radial cross section of 3 (elliptic), nonpressed |
| $AU_{opt}$ | Radial cross section of 3, nonpressed (version in FIG. 9) |
| $AU_R$ | Radial cross section of 3 (OR), nonpressed |
| $(A/L)_{11}$ | Ratio value for $Q_1$ according to equation (1) |
| $(A/L)_{12}$ | Ratio value for $Q_2$ according to the equation (1) |
| B | (radial) breadth of $A_V$ |
| BL | Arc length of $A_V$ |
| C1, C2 | Constants |
| $E_D$ | Modulus of elasticity of 3 |
| $E_E$ | Modulus of elasticity-planar body |
| $E_Z$ | Modulus of elasticity-cylindrical body |
| $F_N$ | Normal force |
| $F_V$ | Prepressing force of 3 |
| $F_S$ | Plugging force of 2 with 3 |
| $F_1$ | Contact area of 3 with 1 |
| FG | Degree of filling of 4 |
| $FZ_U$ | Form coefficient, quotient of HA and HB |
| G | Limit value of A/L between I and II |
| GL | Axial overall length of AU |
| HA | Axial main extent of 3, long ellipse semi-axis |
| HB | Radial main extent of 3, short ellipse semi-axis |
| K1, K2 | Vertex curvature circles |
| KF1, KF2 | Semicircular areas of AU |
| KL | Contact length of 3 with 1 or 2 |
| $KL_1$ | Contact length of 3 with 1 |
| $KL_2$ | Contact length of 3 with 2 |
| L | Permeation length |
| $L_A$ | Bearing length cylinder/plane |
| $L_{max}$ | Maximum permeation length |
| $L_1$ | Bearing length of 3 against 1 over $U_{OI}$ |
| NL | Groove length of 4 (in the direction X-X) |
| OR | O-ring (with a circular cross section $AU_R$ in the nonpressed state) |
| P | Permeation coefficient |
| $p_1$ | High fluid pressure |
| $p_2$ | Low fluid pressure |
| Q | Fluid quantity, leakage quantity |
| $Q_1$ | Hitherto accepted value of Q |
| $Q_2$ | Value of Q achievable according to the invention |
| q | Specific fluid quantity/leakage quantity |
| R | Radius |
| $R_{K1}, R_{K2}$ | Radii of K1, K2 |
| $R_1, R_2, R_3$ | Radii in $AU_{opt}$ |
| $R_A$ | Outer radius of 3, nonpressed |
| $R_a$ | Mean roughness value of 1, 2 |
| $R_I$ | Inner radius of 3, nonpressed |
| $R_{max}$ | Maximum roughness value of 1, 2 |
| $R_{RS}$ | (radial) curvature dimension of 3, nonpressed |
| $R_{SA}$ | Outer radius of 5 |
| $R_{SN}$ | Radius of 5 on the bottom of 4 |
| $R_{SO}$ | Value of $R_{RS}$ in the case of circular cross section (OR) |
| $R_{OI}$ | Inner radius of 6 |
| RF | Rectangular area of AU |
| s | Gap width of 7 |
| SL | Side length of semi-area of AU |
| T | Depth of 4 |
| t | Time |
| U | Transformation factor for HA |
| $U_{OI}$ | Inner circumference of 6 |
| V | Transformation factor for HB |
| VP | Pressing |
| X-X | Longitudinal axis of 1, 2 |
| Y-Y | Radially directed mid-axis of AU |
| Δp | Pressure difference |
| μ | Coefficient of friction |
| $V_E$ | Transverse contraction coefficient-planar body |
| $V_Z$ | Transverse contraction coefficient-cylindrical body |
| Π | Circle constant |
| Θ | Calculation variable |
| $\sigma_{max}$ | Maximum stress |
| $\sigma_{1max}$ | Maximum stress in $F_1$ |
| $\sigma_{2max}$ | Maximum stress |

The invention claimed is:

1. Connection system for conduits, fittings or assemblies which are intended for carrying gaseous carbon dioxide acted upon by a pressure increased with respect to a reference pressure, comprising a first coupling part, a second coupling part, capable of being introduced into the first coupling part along an axis, and at least one gas-permeable circumferential seal which consists of an elastomer and is arranged in a groove, the groove defining a groove depth and a groove length and being formed circumferentially in one of the first and second coupling parts, the second coupling part being capable of being plugged in with a shank into a round receiving orifice of the first coupling part, whereby, after plugging-in, the circumferential seal,
   while undergoing deformation from a non-pressed state to a deformed state and
   generating a radial prepressing force,
   seals off a gap formed between the first and second coupling parts with a gap width between the outer radius of the shank and the inner radius of the receiving orifice and at the same time bears against the first and second coupling parts at least over a contact length,
   measured in the axial direction perpendicularly to the inner and outer radius of the first and second coupling parts, and whereby the cross section of the nonpressed circumferential seal, the groove depth and the gap width and the groove length are coordinated with one another in such a way,
   that a ratio is defined that determines a permeation of the carbon dioxide through the circumferential seal,
   said ratio being defined
      by a permeation-active partial circumferential area of the circumferential seal,
         which is located in the vicinity of the gap on the side of the circumferential seal,
         where is acting the reference pressure and
         where the seal is pressed by the increased pressure in
         the axial direction against one wall of the groove,
         which is determined by an arcuate line of a pressed radial cross-sectional area of the deformed circumferential seal, and
      in relation to the contact length, the permeation-active partial circumferential area is no greater than one fifth of the value of a cross-sectional area of the deformed circumferential seal,
   said cross-sectional area running perpendicularly to the axial direction.

2. Connection system according to claim 1, wherein the cross section of the nonpressed circumferential seal, the groove depth the gap width and the groove length are coordinated in such a way that, the ratio, of the permeation-active partial circumferential area of the circumferential seal to the contact length that determines the permeation through the circumferential seal, the partial circumferential area is no greater than one fifth of the value of a cross-sectional area of the deformed circumferential seal, the said cross-sectional area running perpendicularly to the axial direction.

3. Connection system according to claim 1, wherein the partial circumferential area is arranged in the vicinity of the gap and is determined by an arcuate line of a pressed radial cross-sectional area of the deformed circumferential seal.

4. Connection system according to claim 3, wherein a length of the arcuate line assumes minimally the value of the gap width in the case of a disappearing arcuate curvature and at maximum is no greater than half the value, preferably one quarter of the value, of the sum of the gap width and of the groove depth.

5. Connection system according to claim 1, wherein the cross section of the nonpressed circumferential seal, the groove depth, the gap width, and the groove length are coordinated in such a way that the permeation-active partial circumferential area is independent of a cord thickness of the nonpressed circumferential seal.

6. Connection system according to claim 1, wherein the size of a contact length between the inner radius of the first coupling part and the circumferential seal is dimensioned according to the equation $$KL_1 = C1 \sqrt{\frac{F_V R_{RS}}{E_D R_{OI}}},$$

C1 being a constant, $F_V$ being the prestressing force acting in the radial direction, $R_{OI}$ being the inner radius of the first coupling part, $E_D$ being the value of the modulus of elasticity of the circumferential seal, and $R_{RS}$ being a measure of the convex curvature of the seal, for example the cord radius of an O-ring seal in a nonpressed state.

7. Connection system according to claim 1, wherein a degree of filling of the groove, calculated, taking into account the possible thermal expansion of the circumferential seal, as a quotient of a fraction, lying in the groove, of the pressed radial cross section of the circumferential seal and the cross-sectional area of the groove, lies in the range of 58.0 percent to 100.0 percent.

8. Connection system according to claim 1, wherein in the case of an asymmetric position of the circumferential seal in the groove, taking into account the possible thermal expansion of the circumferential seal, a degree of filling of the groove, calculated as a quotient of a comparatively larger fraction, lying in one half of the cross-sectional area of the groove, of the pressed radial cross section of the circumferential seal and of half the cross-sectional area of the groove, lies in the range of 58.0 percent to 100.0 percent.

9. Connection system according to claim 1, wherein the cross section of the circumferential seal has, in the non-pressed state, a preform, in which a quotient of an axial main extent and of a radial main extent of the seal cross section has a value of greater than 1.

10. Connection system according to claim 1, wherein the cross section of the circumferential seal in the nonpressed state has an elliptic form.

11. Connection system according to claim 1, wherein the cross section of the nonpressed circumferential seal is composed of two semicircular areas or areas in the form of a segment of a circle and a rectangular area lying between the areas.

12. Connection system according to claim 1, wherein the cross section of the nonpressed circumferential seal has a generally rectangular shaped configuration which has two longitudinal sides curved convexly with a first radius of curvature, two transverse sides curved convexly with a second radius of curvature and four corners rounded convexly with a third radius of curvature.

13. Connection system according to claim 12, wherein the third radius of curvature is smaller than the first radius of curvature and the first radius of curvature is smaller than the second radius of curvature.

14. Connection system according to claim 1, wherein the circumferential seal is formed by an O-ring with a cross section which is circular in the nonpressed state, in which the ratio of the inside diameter to the thickness of its cord is smaller than or equal to 6, and in which a minimum pressing lies in a range of more than 15 percent.

15. Connection system according to claim 1, wherein the contact length of the radial cross section of the deformed circumferential seal differs by less than 15 percent, from a maximum axial permeation length through the circumferential seal.

16. Connection system according to claim 1, wherein the first coupling part or the second coupling part consists of metallic materials.

17. Connection system according to claim 1, wherein a maximum roughness value of the surfaces of the coupling parts, at least in the region of the outer radius, of the shank and of the inner radius of the receiving orifice, where the circumferential seal comes to bear, is lower than 16 μm.

18. Connection system according to claim 1, wherein the surfaces of the coupling parts, at least in the region of the outer radius of the shank and of the inner radius of the receiving orifice, where the circumferential seal comes to bear, are produced by the smooth rolling of faces which, as compared with the machined surfaces, have an over dimension of 0.018 mm to 0.040 mm and a roughness in the range of 1.6 to 3.2 μm.

19. Connection system according to claim 1, wherein the circumferential seal includes a polymeric fluorocarbon compound, of synthetic rubber.

20. Connection system according to claim 1, wherein the circumferential seal has a Shore A hardness in the range of 70 to 90.

21. Connection system according to claim 1, wherein two or more circumferential seals are arranged one behind the other in the axial direction.

22. Connection system according to claim 21, wherein an outer circumferential seal accessible to the surrounding atmosphere has a reduced permeability coefficient than an inner circumferential seal protected from the surrounding atmosphere by the outer circumferential seal.

23. Connection system according to claim 1, wherein the pressure acting upon the carbon dioxide, lies in the range of about 10 bar to 180 bar.

24. Connection system according to claim 1, wherein a value of the quantity of the carbon dioxide, which has penetrated through the circumferential seal as a result of permeation is no greater than about 2.5 g per year and connection.

25. Connection system according to claim 1, wherein the ratio determining the permeation through the circumferential seal is no greater than 50.0 mm, at room temperature.

26. Connection system according to claim 1, wherein the ratio determining the permeation through the circumferential seal is no greater than 4.5 mm, at 100° C.

27. Connection system according to claim 1, wherein the ratio determining the permeation through the circumferential seal is no greater than 1.00 mm, preferably no greater than 0.25 mm at 150° C.

28. Connection system according to claim 1, wherein a plugging force which can be applied for plugging-in, while the circumferential seal undergoes deformation and the radial prepressing force is generated, is, in the case of an inner radius of the first coupling part in a range of about 6 mm to 13 mm, lower than 100 N.

29. Connection system according to claim 1, wherein the circumferential seal is provided with a gas barrier coating.

30. Connection system for conduits, fittings or assemblies which are intended for carrying gaseous carbon dioxide acted upon by a pressure increased with respect to a reference pressure, comprising
 a first coupling part,
 a second coupling part,
  capable of being introduced into the first coupling part along an axis, and at least one gas-permeable circumferential seal which consists of an elastomer and is arranged in a groove, the groove having a groove depth and a groove length
 and being formed circumferentially in one of the first and second coupling parts,
 the second coupling part being capable of being plugged with a shank into a round receiving orifice of the first coupling part,
whereby, after plugging-in, the circumferential seal,
 while undergoing deformation from a non-pressed state to a deformed state and
 generating a radial prepressing force,
 seals off a gap with a gap width between the outer radius of the shank and the inner radius of the receiving orifice and
 at the same time against the first and second coupling parts at least over a contact length,
  which is running in the axial direction perpendicularly to the inner and outer radius of the first and second coupling parts,
and whereby the cross section of the nonpressed circumferential seal, the groove depth and the gap width and the groove length are coordinated with one another in such a way,
 that in a ratio, that determines a permeation through the circumferential seal,
  said ratio being defined
  by a permeation-active partial circumferential area of the circumferential seal,
   which is located in the vicinity of the gap on the side of the circumferential seal
    where is acting the reference pressure and
    where the seal is pressed by the increased pressure in the axial direction against one wall of the groove,
   which is determined by an arcuate line of a pressed radial cross-sectional area of the deformed circumferential seal, and
  in relation to the contact length,
the permeation-active partial circumferential area is not greater than half the value of a cross-sectional area of the deformed circumferential seal,
 said cross-sectional area running perpendicularly to the axial direction and
said ratio determining the permeation through the circumferential seal being not greater than 1.00 mm, at a temperature of 150° C.

* * * * *